United States Patent [19]
Loos

[11] Patent Number: 5,995,954
[45] Date of Patent: Nov. 30, 1999

[54] METHOD AND APPARATUS FOR ASSOCIATIVE MEMORY

[76] Inventor: Hendricus G. Loos, 3019 Cresta Way, Laguna Beach, Calif. 92651

[21] Appl. No.: 07/853,107

[22] Filed: Mar. 18, 1992

[51] Int. Cl.$^6$ .................................................. G06F 15/18
[52] U.S. Cl. .................................. 706/26; 706/40; 706/41
[58] Field of Search ............................. 395/24, 25, 27, 395/425, 275; 364/727

[56] References Cited

U.S. PATENT DOCUMENTS

| | | | |
|---|---|---|---|
| 4,807,168 | 2/1989 | Moopenn et al. | 395/27 |
| 4,892,370 | 1/1990 | Lee | 364/727 |
| 4,956,564 | 9/1990 | Holler et al. | 395/24 |
| 4,961,002 | 10/1990 | Tam et al. | 395/24 |
| 5,023,833 | 6/1991 | Baum et al. | 395/425 |
| 5,028,810 | 7/1991 | Castro et al. | 395/24 |
| 5,034,918 | 7/1991 | Jeong | 395/24 |
| 5,072,130 | 12/1991 | Dobson | 395/24 |
| 5,080,464 | 1/1992 | Toyoda | 395/25 |
| 5,167,007 | 11/1992 | Toyoda | 395/25 |

*Primary Examiner*—Tariq R. Hafiz

[57] ABSTRACT

A method and apparatus for an electronic artificial neural network, which serves as an associative memory that has a complete set of N-dimensional Hadamard vectors as stored states, suitable for large N that are powers of 2. The neural net has nonlinear synapses, each of which processes signals from two neurons. These synapses can be implemented by simple passive circuits comprised of eight resistors and four diodes. The connections in the neural net are specified through a subset of a group that is defined over the integers from 1 to N. The subset is chosen such that the connections can be implemented in VLSI or wafer scale integration. An extension of the Hadamard memory causes the memory to provide new Hadamard vectors when these are needed for the purpose of Hebb learning.

11 Claims, 2 Drawing Sheets

METHOD AND APPARATUS FOR ASSOCIATIVE MEMORY

This invention was made with Government support provided by the Defense Advanced Research Projects Agency, ARPA Order 6429, through Contract DAAH01-88-C-0887, issued by the U.S. Army Missile Command. The Government has certain rights in the invention.

BACKGROUND OF THE INVENTION

The invention pertains to electronic artificial neural networks, in which many simple electronic units are heavily interconnected such that they are capable of massively parallel computation. As is customary in the discussion of artificial neural networks, functional parts are given names suggested by neurobiology, and the adjective "artificial" is suppressed; hence we will speak here simply of "neurons", "synapses", and "dendrites".

With this understanding, a neural net may be described as a collection of functional units, called neurons, which are interconnected via junctions, called synapses, and input lines called dendrites. Each dendrite collects synaptic outputs into a sum, called activation, which is presented to a neuron for processing according to an output function, thereby producing a signal. In electronic neural nets, the signals are usually voltages, the activations are electric currents, and the neurons are operational amplifiers which have an activation current as input, and a signal voltage as output. The output function is usually of sigmoidal type, such as the hyperbolic tangent. The dendrite of the neuron is a conductor that collects the output currents of certain synapses. The synaptic inputs are signals from certain neurons.

Neural networks can be structured in such a manner that the net functions as an associative memory, i.e., a device that is capable of associative recall, in which an input vector x produces as output the stored vector that is closest to x. Undesirable consequences of correlations between stored vectors can be eliminated by encoding the stored vectors as orthogonal bipolar vectors, i.e., orthogonal vectors with components 1 and −1. Such vectors are called Hadamard vectors. Encoding the stored vectors $q_\alpha$, $\alpha=1$ to L, as Hadamard vectors means that to every stored vector $q_\alpha$ is assigned a Hadamard vector $h_\alpha$. These assignments may be expressed in an outer products matrix $$B = \sum_\alpha h_\alpha^T q_\alpha,$$

where T denotes transposition.

The encoding is used in the following manner. From an input vector x one forms the vector $$u = Bx^T = \sum_\alpha h_\alpha^T (q_\alpha x^T);$$

this is just a linear combination of Hadamard vectors $h_\alpha$, with coefficients $c_\alpha = q_\alpha x^T$, the scalar products of x with the vectors $q_\alpha$. The operation $Bx^T$ is performed by a device called Bidirectional Linear Transformer (BLT). The bidirectional feature will become clear presently. The BLT is followed by a device that selects, from the linear combination $$u = \sum_\alpha c_\alpha h_\alpha^T,$$

the Hadamard vector that goes with the largest of the coefficients $c_\alpha$, if unique. Hence, if $c_\beta > c_\alpha$ for all $\alpha \neq \beta$, then the Hadamard vector $h_\beta$ is selected. The device has been named Dominant Label Selector (DLS), because the code vectors $h_\alpha$ serve as labels for the stored vectors $q_\alpha$. The output $h_\beta$ of the DLS is returned to the BLT for a backstroke, in which the BLT produces the vector $$x' = h_\beta B = \sum_\alpha h_\beta h_\alpha^T q_\alpha = N q_\beta,$$

where N is the dimension of the Hadamard vectors. The result holds because the Hadamard vectors are orthogonal and have the Euclidean norm $\sqrt{N}$. Division by N or, in case of a bipolar x, thresholding with a sigmoidal function that ranges from −1 to 1, gives $x' = q_\beta$. But $\beta$ is the index for which $c_\alpha$ is maximum. Since $c_\alpha = q_\alpha x^T$, the vector $q_\beta$ is the stored vector which has the largest scalar product with the input vector x. Therefore, if the DLS indeed selects from $u = Bx^T$ the dominant Hadamard vector, then the device consisting of the BLT and the DLS has perfect associative recall of up to N stored vectors. The device has been called Selective Reflexive Memory (SRM) [1–4]. Its front end, the BLT, may be seen as a Bidirectional Associative Memory (BAM) [5–7], with the rear thresholding removed, and the front thresholding optional. The DLS in the rear may be seen as a distributed winner-take-all net; instead of selecting from an analog vector the maximum component, the net selects the largest term in the Hadamard expansion of the vector. Distributing the winner-take-all process improves fault tolerance, since there are then no grandmother cells.

Since the DLS output is the Hadamard vector that is closest to the vector u, the DLS may itself be seen as an associative memory with a complete set of Hadamard vectors as stored states. Therefore, this DLS is called a Hadamard memory.

A Hadamard memory cannot be constructed with the customary linear activation. Instead, one may consider a net with quadratic activation, so that the total current in the dendrite of neuron i is $$I_i = \sum_{j,k} S_{ijk} y_j y_k, \qquad (1)$$

where $y_i$ is the signal from neuron i, determined from the activation $v_i$ of the neuron by the output function $s(.)$, $$y_i = s(v_i). \qquad (2)$$

The function $s(.)$ is restricted to be sigmoidal and antisymmetric, and to have the range $[-1,1]$. Hence, fully developed neuron signals are bipolar. All indices range from 1 to N, restricted to be a power of 2. In the simplest continuum model, the equations of motion are $$\dot{v}_i = -v_i + I_i + r_i, \qquad (3)$$

where dot denotes differentiation with respect to time, and the term $r_i$ expresses a threshold or an external coupling. The first two terms in (3) have unit coefficients, but that does not constitute a physical restriction, since this form can always be obtained by scaling of the time and activation, together with a related adjustment of the neuron output function s(.). In view of the quadratic form of the dendrite current (1), one has here a case of higher-order neurons [8,9]. A Hadamard memory is obtained by choosing the connection tensor as $$S_{ijk} = (1/N)\sum_{\alpha} h_{\alpha i} h_{\alpha j} h_{\alpha k}, \qquad (4)$$

where $h_{\alpha i}$ is the ith component of the Hadamard vector $h_\alpha$. It has been shown [8] that a neural net with nonlinear activation is stable if the connection tensor is symmetric, and if all tensor components for which two or more indices are equal vanish. The connection tensor given by (4) is indeed symmetric. In order to satisfy the second condition, subtractions have to be applied, to give the tensor $$S_{ijk} = \qquad (5)$$
$$(1/N)\sum_{\alpha} h_{\alpha i} h_{\alpha j} h_{\alpha k} - N\delta_{ij}\delta_{kl} - N\delta_{jk}\delta_{il} - N\delta_{ki}\delta_{jl} + 2N\delta_{il}\delta_{jl}\delta_{kl},$$

where $\delta_{ij}$ is the Kronecker delta. The subtractions are correct for a choice of Hadamard vectors such that their first component is +1, and the vector $h_1$ has all components +1. The connection tensor (5) is referred to as subtracted. It can be shown that all nonzero connection tensor components have the same value, which is positive; this is true for (4) as well as for (5). Hence, in a Hadamard memory, all synapses are excitatory, and they all have the same strength. Up to couplings, the structure of the memory is entirely determined by the connections.

The BLT output must be coupled to the Hadamard memory. This may be done in several ways. In initial value coupling, the BLT output u is used as an initial value of the activation v, after multiplying with a properly chosen coupling constant. The term $r_i$ in the equation of motion (3) is then taken as constant, usually zero. In the external coupling the activation is started out at zero, and the BLT output $u_i$ is applied to the term $r_i$ of (3), after multiplication with a coupling constant. Combined coupling involves a combination of these schemes.

Computer simulations have shown the Hadamard memory to have perfect associative recall, for N=8 and 16, for each of these couplings, for a range of coupling constants, and for unsubtracted as well as subtracted connection tensors, (4) and (5).

In practice, Hadamard memories become particularly important for large dimension N. For N a power of 2, and with well-chosen Hadamard vectors, the number of product synapses is N(N−1)/2 and (N−1)(N−2)/2 respectively for unsubtracted and subtracted connection tensors; these numbers of connections are about the same as for a fully connected Hopfield memory [10]. It is difficult to construct so many connections in electronic implementations for large dimension N. For instance, for N=1024, one would need 522753 connections in the subtracted case. Furthermore, each synapse must compute the product of its two inputs, and that requires a four-quadrant multiplier, with at least 9 transistors [11]. For the example mentioned above, that comes to 4.7 million transistors for the synapses alone! It is an object of the present invention to overcome the problem of the large number of connections and synapse transistors, for Hadamard memories of large dimension N.

With the Hadamard memory used as the rear stage of an SRM, many applications require the BLT to be adaptive. The connection matrix $$B = \sum_{\alpha} h_{\alpha}^T q_{\alpha}$$

of the BLT has outer-products structure, and it can therefore be modified by Hebb learning [12]. This requires that a new Hadamard vector be presented to the back of the BLT, whenever a new vector $q_\alpha$ is to be stored. An extension to the Hadamard memory is needed, that causes the memory to provide such vectors in a simple manner, when learning is required. It is the further object of the present invention to furnish such an extension.

SUMMARY

It is the object of the present invention to provide a method and means for constructing Hadamard memories of large dimension, in such a manner that 1) the connections can be implemented in VLSI or wafer-scale integration, 2) the synapses are such that they can be implemented by simple passive circuits, and 3) the Hadamard memory supplies heretofore unused Hadamard vectors for the purpose of Hebb learning.

Object 1) is met as follows.

In the course of computer experiments we discovered that, as the dimension N is increased, the fraction of connections that needs to be implemented in order to obtain good associative recall diminishes dramatically, to a degree that was completely unexpected. This sets the stage for massive pruning of the connections implied by (4) or (5), essentially without loss of performance.

The set of selected connections needs to be shift invariant, in order that the dendrites can be implemented in a compact fashion on a chip or wafer. There is also a slope limitation on the segments of the dendrites, which is chosen to avoid overcrowding of the dendrites.

Finally, the selected connections must be chosen from the components i, j, k, for which the connection tensor (4) or (5) is nonzero. For large N, the calculation of these index combinations (i,j,k), based on the Hadamard vectors, is very lengthy. We give a shortcut for this calculation, based on group properties, shift invariance, and the window property. From the resulting set of index combinations (i,j,k), a small subset of connections to be implemented is selected by using the slope limitation condition. An example result is shown in FIGS. 1 and 2, for dimension N=1024.

Object 2) is met as follows.

The quadratic dendrite current (1) requires use of product synapses, which, for signal inputs $y_j$ and $y_k$, produce an output current proportional to $y_j y_k$. Although the product operation is simple in computer simulation, implementation in hardware is cumbersome, requiring at least 9 transistors. Considering the very large number of synapses that need to be placed on a chip or wafer for large dimension N, it is important to simplify the synapse circuitry, which means giving up the product function. We have found a synapse circuit that is comprised of 8 resistors and 4 diodes, and that provides, for fully developed neuron signals, the same output current as a product synapse; however, this circuit requires a doubling of the neuron signal lines, such that one line carries the signal voltage, and the other line carries the opposite voltage. For underdeveloped neuron signals, i.e., signals with magnitude below unity, the synapse output current deviates from the product function. However, computer simulations of associative recall for N=1024 and N=2048 have shown that these "RD" synapses are satisfactory, if the connections are chosen in the manner discussed.

Object 3) is met as follows.

Hebb learning amounts to adding to the synaptic matrix of the BLT a matrix $$\delta B = h_\gamma^T x, \quad (6)$$

where $h_\gamma$ is the Hadamard vector that we want x to be labeled with. The Hebb addition (6) to the BLT matrix should be made only if the input vector x is much different from all the vectors that have been stored so far. That condition can be easily checked by computing the correlation between the input vector and output vector of the Hadamard memory. For large N, it is cumbersome to find the new Hadamard vector $h_\gamma$ that must be presented to the back of the BLT for the Hebb learning (6). We have found a method of acquiring $h_\gamma$, simply by letting the Hadamard memory determine this vector by associative recall, using as input vector a bipolar counter word of bit length $m = \log_2 N$, concatenated with zeros. Incrementing the counter, everytime that learning is required as evidenced by a "weak" correlation, and presenting the counter word to the Hadamard memory, then results in a new Hadamard vector for the Hebb learning. The method relies on the so-called window property of Hadamard vectors that have been constructed from maximal-length shift-register sequences [13].

DETAILED DESCRIPTION

Figure 1:
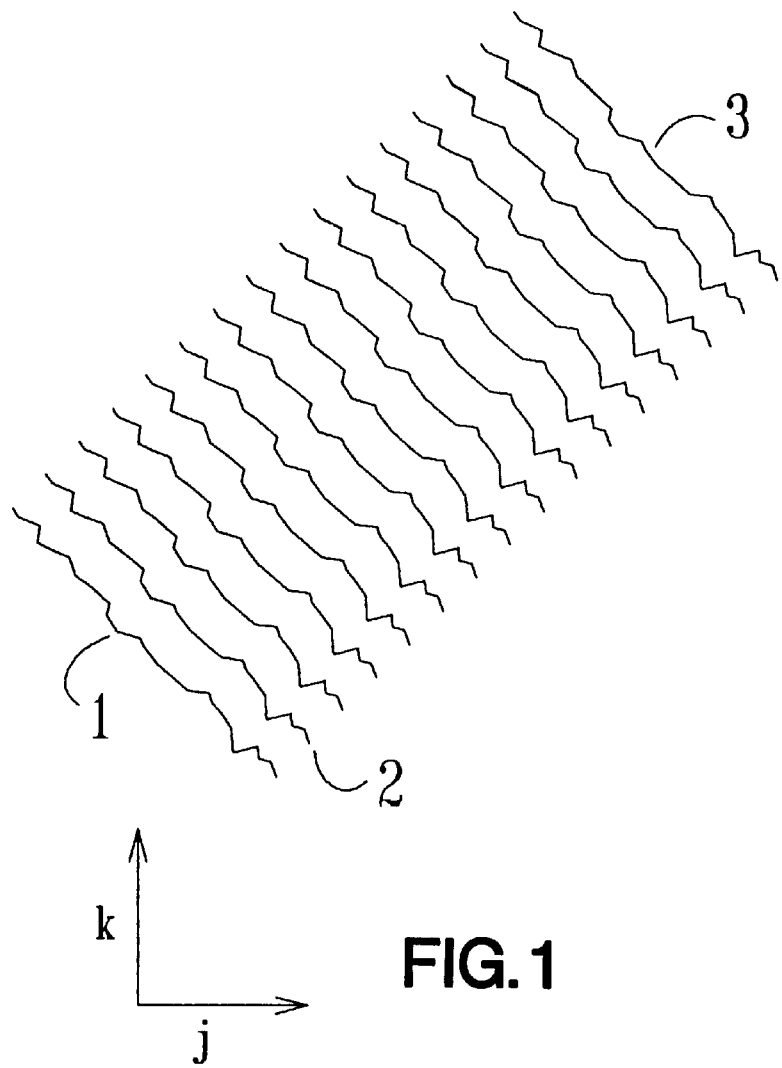
FIG. 1 depicts the layout of dendrites in a single plane in VLSI or wafer-scale integration.

The first object of the invention is to have a Hadamard memory with relatively few connections; the second object is to modify the product synapses such that they can be implemented electronically by simple circuits. The discussion of how to meet these objects is begun by generalizing the total dendrite current (1) to the expression $$I_i = \sum_{j,k} S_{ijk} f(y_j, y_k), \quad (7)$$

where $f(y_j, y_k)$ product in (1). This step prepares for synapse functions other than a product of the two incoming neuron signals. The tensor $S_{ijk}$ in (7) is the connection tensor. This tensor specifies how the neural net is hooked up; neurons j and k are connected to a synapse on the dendrite of neuron i, if and only if the tensor component $S_{ijk}$ is not zero. The dendrite current (7) implies that the synapses are uniform, since they all have the same output function $f(.,.)$. Uniformity of the synapses further requires that all nonvanishing components of the tensor $S_{ijk}$ have the same value; the latter is taken as unity, without loss of generality. We also want the synapses to be symmetric, which requires that the function $f(.,.)$ is such that $$f(y,z) = f(z,y), \quad (8)$$

for all neuron signals y and z, and moreover that the connection tensor $S_{ijk}$ satisfies the condition $$S_{ijk} = S_{ikj}, \quad (9)$$

for all indices i, j, and k that belong to the index set $\Omega_N$ that ranges from 1 to N. At this point we also want to satisfy the restrictions that imply stability of nets with higher-order neurons [8], $$S_{ijk} = S_{kij} = S_{jki}, \quad (10)$$

and $$S_{iij} = 0, \quad (11)$$

valid for all i,j, and k belonging to the index set $\Omega_N$. The conditions (9) and (10) imply that there exist triads of indices, (i,j,k), for which the order of indices is irrelevant, and which determine the connections by the condition that the outputs of neurons j and k are connected to a synapse on dendrite i if and only if the indices i, j, and k form a triad. We choose to express the fact that neurons j and k are connected to a synapse on dendrite i symbolically as $j*k=i$. We thus have that a triad (i,j,k) implies that $j*k=i$, $i*j=k$, $k*i=j$, and further that the operation * is commutative. In order to extend the range of calculations, the operation * is endowed with associativity, so that $i*(j*k)=(i*j)*k$, and the brackets may be omitted. Suppose that triads (i,j,k) can be defined for all indices i and j of the set $\Omega_N$, such that $k \in \Omega_N$. Then, for given i there exists a triad (i,i,c). That implies that $c*i=i$. For $k \neq i$ there is a triad (i,j,k), implying that $i*j=k$. Writing, in the last equation, i as $c*i$ gives $c*i*j=k$, with the result that $c*k=k$. Since k was unequal to i, but otherwise arbitrary in $\Omega_N$, it follows that $c*k=k$ for all $k \in \Omega_N$. Hence, the index c acts as an identity in the composition *. The last equation and (10) imply that $k*k=c$; hence, under the composition *, each index is its own inverse. Hence, (k,k,c) is a triad, for all $k \in \Omega_N$. Now, all the conditions for a group are satisfied; hence, if triads (i,j,k) exist for all i and j that belong to $\Omega_N$, such that $k \in \Omega_N$, then the triads define over the index set $\Omega_N$ a commutative group with composition *. We call the group a triad group. The index c that acts as the identity may be assigned as unity, without loss of generality. It can be shown that a triad group exists for all N that are powers of 2. For other N a triad group does not exist. The triads (i,i,1) are called trivial triads; the remaining triads are nontrivial. Condition (11) is satisfied by omitting connections with trivial triads. Because neuron #1 is then not connected to anything, it can be omitted. However, we still need a #1 output line for the DLS, if the DLS output is to be processed by the BLT in the backstroke. The #1 output line must then be permanently clamped to +1, $$y_1 = 1. \quad (12)$$

The indices 2 to N can be permuted in such a manner that the triads become shift invariant. This means that, if (i,j,k) is a nontrivial triad, so is (i+1,j+1,k+1). If a sum exceeds N, a wrapping is applied, by changing the sum s to (s−2)mod (N−1)+2. The wrapping is somewhat complicated because of the identity role played by the unit integer, and physically, because neuron #1 is not implemented.

The shift-invariant triad group over the index set $\Omega_N$ for $N=2^m$, $1 < m \leq 21$, can be constructed by the following procedure. The trivial triads are of course (1,i,i), with $i \in \Omega_N$. The nontrivial triads (i,j,k) have indices in $\Omega'_N$, the set of indices from 2 to N. We will discuss how to recursively construct m-dimensional bipolar vectors $g_i$, $i \in \Omega'_N$, starting out with $g_2$, which is chosen to have all components equal to −1. The components of $g_i$ are here denoted as $g_{i,\alpha}$, $\alpha = 1$ to m. For m any of the special values 2, 3, 4, 5, 6, 7, 9, 10, 11, 15, 17, 18, 20, and 21, the recursion formulas are $$g_{i+1,\alpha} = g_{i,\alpha+1} \text{ for } \alpha=1 \text{ to } m-1, \quad (13)$$

$$g_{i+1,m} = g_{i,1} g_{i,1+n}, \quad (14)$$

where n is given in Table I.

TABLE I

| m | n |
|---|---|
| 2 | 1 |
| 3 | 1 |
| 4 | 1 |
| 5 | 2 |
| 6 | 1 |
| 7 | 1 |
| 9 | 4 |
| 10 | 3 |
| 11 | 2 |
| 15 | 1 |
| 17 | 3 |
| 18 | 7 |
| 20 | 3 |
| 21 | 2 |

For the remaining values of m: 8, 12, 13, 14, 16, and 19, Eq. (13) is used, but Eq. (14) is replaced by the formula given in Table II.

TABLE II

| m | $g_{i+1,m}=$ |
|---|---|
| 8 | $g_{i,1} g_{i,2} g_{i,6} g_{i,7}$ |
| 12 | $g_{i,1} g_{i,4} g_{i,5} g_{i,8}$ |
| 13 | $g_{i,1} g_{i,2} g_{i,4} g_{i,5}$ |
| 14 | $g_{i,1} g_{i,2} g_{i,12} g_{i,13}$ |
| 16 | $g_{i,1} g_{i,3} g_{i,4} g_{i,6}$ |
| 19 | $g_{i,1} g_{i,2} g_{i,6} g_{i,7}$ |

For given $m \leq 21$, starting with $g_2$ as the all-negative bipolar vector, the bipolar vectors $g_3, g_4, \ldots, g_N$ may be calculated with the recursion formulas given. It turns out that the sequence $g_2, g_3, \ldots, g_N$ contains all bipolar vectors of dimension m, except for the all-positive vector. From this sequence, the nontrivial triads (2,j,k) are found, for every j=3 to N, by finding an index k such that $$g_k = -g_j; \quad (15)$$

such an index $j \in \Omega'_N$ always exists. Once all the nontrivial triads (2,j,k) are known, shift invariance determines the rest of the nontrivial triads.

It remains to choose a subset B of the shift-invariant nontrivial triads group such that the connections made according to the subset can be implemented in VLSI or wafer-scale integration. The object is here to choose the subset B such that the dendrites do not get too crowded in the dendrite plane, i.e., the plane in which the dendrites are located. The description of this condition is given here in terms of the codiagonal, defined as the straight line which contains the points for which j+k=N, where the indices j and k serve as Cartesian coordinates in the dendrite plane. If γ, $0 \leq \gamma \leq 90°$, is the angle between the codiagonal and a straight-line segment of the dendrite, then the slope of the dendrite segment is defined as tan γ. Overcrowding of the shift-invariant set of dendrites is avoided by limiting the slopes of the dendrite segments to a value equal to 3 or so.

The subset B of triads must itself be shift invariant, in order to assure that the dendrites form a shift-invariant set. The dendrite #i must connect the synapses with outputs to neuron i; let these synapses be chosen according to the subset $B_i$ of B. $B_i$ consists of the triads (i,j,k) of B for which the first index has the value i. The dendrite for neuron #2 must connect the synapses according to the set $B_2$, and there is a question of the order in which these connections are to be made. The ordering protocol requires that the connection sequence of synapses according to the set $B_2$ of triads (2,j,k) be such that j−k changes monotonically along the dendrite. An example of a dendrite that satisfies the ordering protocol as well as the slope limitation condition for the dimension N=1024 is depicted in FIG. 1, where the dendrite #2 is denoted as 1. The dendrite runs roughly along the codiagonal. In this case the slopes of the dendrite segments are all smaller than 2.5. The complete set of dendrites is found by parallel displacement of dendrite #2, with displacement vectors that are multiples of the vector with Δj=1 and Δk=1. In FIG. 1 only a small fraction of the dendrites are shown, lest the dendrite area appears completely black. The dendrites shown have a spacing of 64. Dendrite #66 is marked as 2, and dendrite #1024 is marked as 3.

Figure 2:
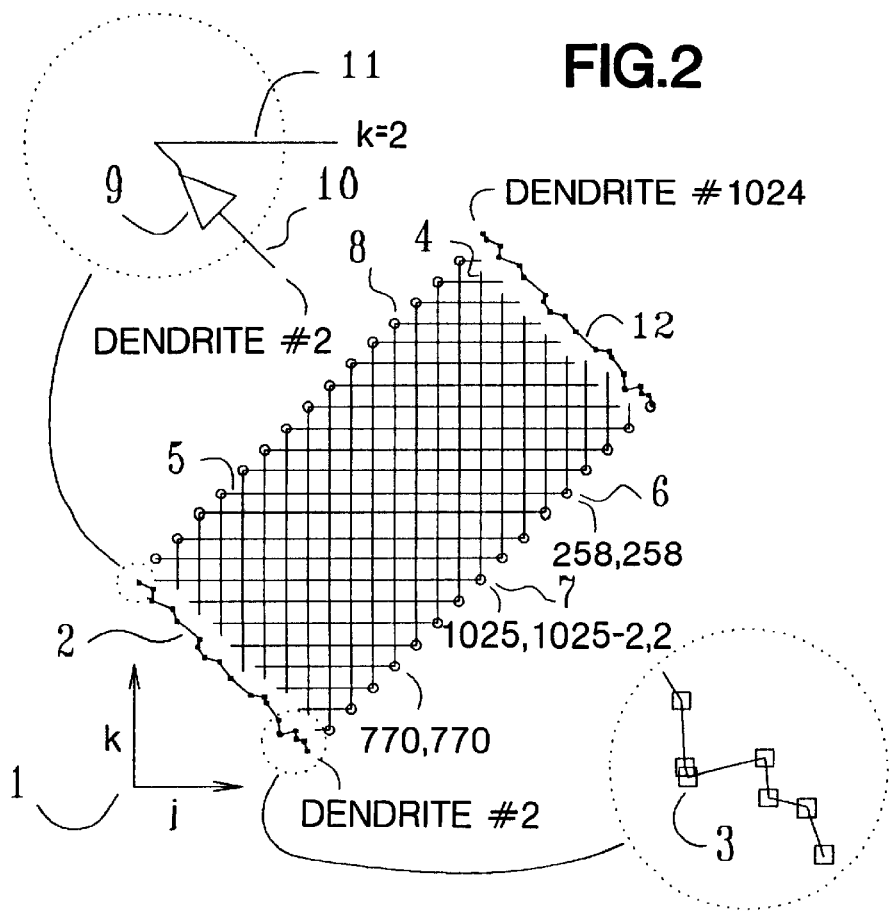
FIG. 2 shows the arrangement of input lines, their ties, and the hookup of the operational amplifiers that implement the neurons.

The question remains how to organize the input lines to the dendrites in VLSI or wafer-scale integration. The organization is shown in FIG. 2, which depicts a preferred embodiment for the dimension N=1024. As before, the integer indices j and k in a triad (2,j,k) serve as Cartesian coordinates, the coordinate system being marked as 1. Implementation of the triad (2,j,k) involves a synapse with input lines j and k, and an output to dendrite #2, denoted as 2 in the Figure. The synapses on dendrite #2 are shown in FIG. 2 as small squares, located on the kinks in the dendrite #2. For instance, the synapse that implements the triad (2,431,563) is denoted as 3. A reverse wrapping has been applied if it improves the simplicity and compactness of the chip; for instance, k=563 was actually plotted as k=−460.

From the dendrite #2, the other dendrites are found by parallel displacement, using displacement vectors that are multiples of the vector (Δj,Δk)=(1,1), as discussed above. In FIG. 2, only two dendrites are shown: #2, denoted as 2, and #1024, denoted as 12. In between these first and last dendrites, the dendrite plane contains 1021 other dendrites, a small fraction of which are shown in FIG. 1. In accord with the use of the indices j and k in a Cartesian coordinate system, the signal input lines to the synapses are arranged in two planes that are parallel and close to the dendrite plane; in each of the two planes the lines are parallel, and the lines in one plane are perpendicular to the lines in the other plane. The j plane contains "vertical" lines of fixed j value; the vertical line j=2 is denoted in the FIGS. 2 as 4. The k-plane contains "horizontal" input lines; the horizontal line k=258 is denoted in the Figure as 5. The input lines in the two planes are connected with ties at the points that are indicated with circles in the Figure. The ties are short conductors that run perpendicular to the planes. The ties connect lines that have the same index. Therefore, they are placed at the points in the coordinate system where j=k. These points lie on a "diagonal", and they are near one border of the chip or wafer; this border may be called the "lower border", with the understanding that it runs under a 45° angle in the Figure. The tie at j=k=258 is denoted in the Figure as 6. The wrapping, defined above, requires identification of certain lines with different indices. For instance, the vertical line with j=1025 is also labelled as j=2, as suggested by the coordinates shown in the Figure at the point denoted as 7. The wrapping requires that ties are also placed along a diagonal near the "upper border" of the chip or wafer. An example for such a tie is denoted as 8. The Figure shows input lines at spacings of 64. The actual spacing is unity, but lines with that spacing cannot be shown on the scale of the Figure, since the lines would completely fill the chip area an make it appear black.

The synapse circuit to be chosen requires a doubling of the input lines, so that every j line doubles into a $j_+$ and a $j_-$ line, and every k line doubles into a $k_+$ line and a $k_-$ line. The + lines and the − lines carry opposite voltages. The input line doubling allows a simple passive circuit for the synpses, in a manner to be discussed. For clarity, the doubling is not shown in FIG. 2. Ties are made only between lines of the same type.

At each synapse location (j,k) connections are made from the synapse input ports called $a_+$ and $a_-$ respectively to the $j_+$ line and the $j_-$ line, and connections are made from the remaining synapse input ports $b_+$ and $b_-$ respectively to the $k_+$ line and the $k_-$ line. These connections can be made very short, because of the placement of the synapse. The synapse output port is connected to the dendrite that runs essentially through the point (j,k), and thus this connection can be made very short also. The synapse can be implemented entirely in silicon, with the circuit components located conveniently in a compact cluster centered at or near the point (j,k), at convenient depths, reckoned from the dendrite plane. The $j_+$, $j_-$, $k_+$ and $k_-$ lines, and the dendrites, are implemented on the chip or wafer by aluminum strips or other electrical conductors.

The dendrites collect the synapse output currents, and connect to the inputs of the amplifiers that implement the neurons. The upper insert in FIG. 2 shows how these connections are made, by depicting neuron #2, marked as 9, with input provided by dendrite #2, marked as 10, and with the output connected to the horizontal line with k=2, marked here as 11. Again the doubling of the neuron signal lines is not shown; really, amplifier 9 has two outputs, say, $c_+$ and $c_-$, and the voltages on these outputs have opposite values.

The amplifiers that serve the role of neurons can be implemented as operational amplifiers for which the inverting input is used as input port, while the noninverting input is grounded. A sigmoidal output function is obtained either as a consequence of the saturation near the power supply voltages, or by the use of silicon diodes or zener diodes in the feedback circuit, in a manner that is known to those skilled in the art. The amplifiers need to have two output ports, $c_+$, and $c_-$, with opposite output voltages. This can be achieved in a manner that is known to those skilled in the art. Power supply voltages may be chosen as ±2.5V.

The layout depicted in FIG. 2 features short connections and a compact design for VLSI or wafer-scale integration.

Figure 3:
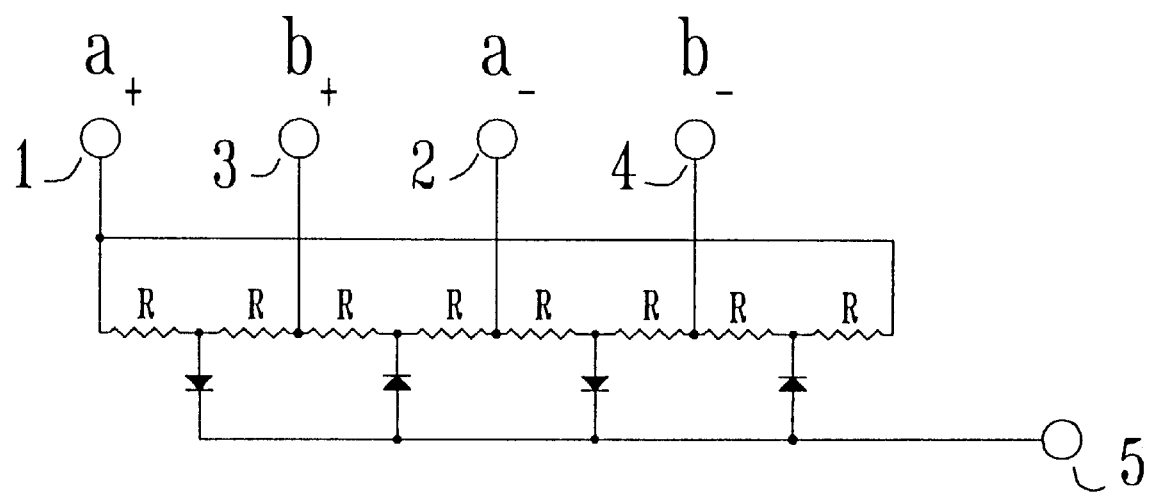
FIG. 3 shows the schematic for a synapse that employs passive circuitry.

FIG. 3 shows the simple passive circuit for the synapses. A single synapses is shown with input ports $a_+$, $a_-$, $b_+$, and $b_-$, respectively marked as 1, 2, 3, and 4, and with an output port marked as 5. The circuit consists of eight resistors with resistance R, and four substantially identical diodes, hooked up as shown. It is easy to see that, with voltages x, −x, y, and −y applied respectively to the input ports $a_+$, $a_-$, $b_+$, and $b_-$, the current from the output port 5 to ground is approximately equal to $$I=(1/R)(g(|x+y|-2d)-g(|x-y|-2d)), \quad (16)$$

where d is the forward diode barrier voltage, and g(.) is a function such that g(q)=q for postive q, and g(q)=0 for negative or zero q. For implementations in silicon, the diodes will have a forward barrier of about 0.6V. Computer simulations have shown such a barrier to be acceptable, if the maximum neuron output voltage is chosen as V=2.5V or so.

The choice of the resistance R is to be made with the following considerations. The resistance R is related to the input resistance $R_0$ of the amplifiers and the feedback resistance $R_f$ of the amplifiers through the relation $$\mu=R_fR_0/R, \quad (17)$$

where $\mu$ is the slope of the sigmoid function s(.) (see (2)), at the origin. Computer simulations have shown the value $\mu$=50 to give good results; the performance of the Hadamard memory does not depend much on the precise value of $\mu$. The choice of amplifier is influenced by the input resistance $R_0$, the input capacitance $C_0$, the slew rate, the input noise current, and the ease of VLSI implementation in silicon. The $R_0C_0$ time corresponds to the time step $\Delta t=1$ in the theory that uses normalized equation of motion (3). The $R_0C_0$ time and the slew rate need to be appropriate to the speed that is required of the Hadamard memory; computer simulations have shown that the Hadamard memory settles its output within about ½ of the $R_0C_0$ time, for $\mu$=50, and for initial value coupling with coupling constants near unity. The value of R also influences the magnitude of the current into the amplifiers; this current should be compared with the input noise current. It is emphasised that the Hadamard memory has a large measure of noise tolerance, so that rather small signal-to-noise ratios are allowable at the amplifier input. Of course, the resistance R and the voltage V influence the power dissipation on the chip or wafer. Finally, there are practical limitations on the values of R that can be implemented in a simple manner in silicon. The considerations mentioned can be used by those skilled in the art to arrive at a sensible choice of the resistance R, and the feedback resistance $R_f$, together with the amplifier parameters.

Figure 4:
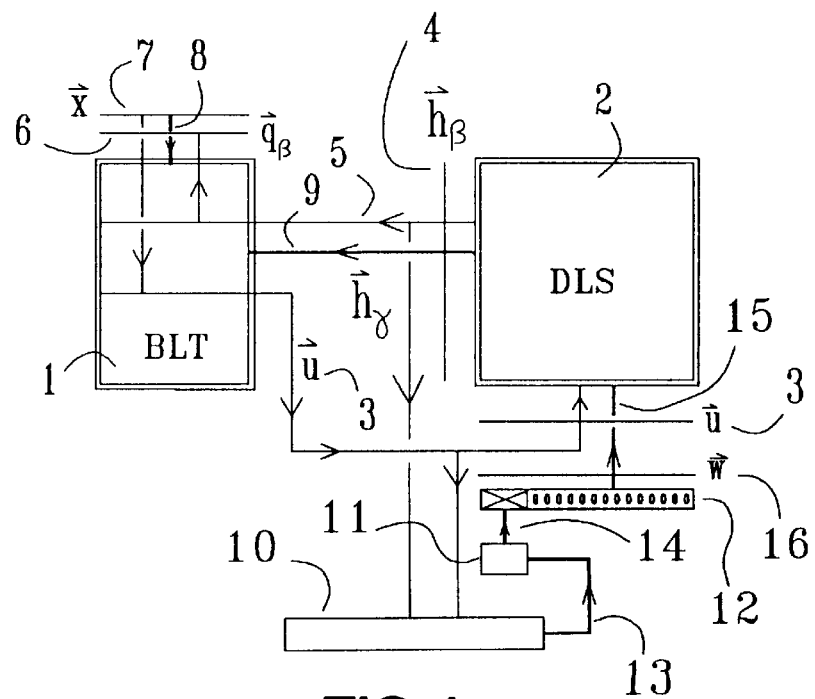
FIG. 4 shows a context in which a Hadamard memory can be used, and also illustrates a method for providing new Hadamard vectors for the purpose of Hebb learning.

The purpose of FIG. 4 is twofold: 1) to show a context in which the Hadamard memory can be used, and 2) to schematically depict an extension of the Hadamard memory that causes the memory to provide a new Hadamard vector for the purpose of Hebb learning, whenever such learning is required. Shown is an SRM with frontstage 1 and rear stage 2. The front stage is a BLT as described in the background section. The BLT transforms an input vector x into a vector u, which is a linear combination of Hadamard vectors, with as coefficients the correlations between x and the stored vectors $q_\alpha$. The vector u is used as the input to the rear stage 2. The rear stage is a DLS as discussed in the background section; it is a Hadamard memory, i.e., an associative memory that has a complete set of Hadamard vectors as stored states.

The Hadamard memory 2 returns to the BLT 1 the vector $h_\beta$, the Hadamard vector 4 that is dominant in the vector u. In the backstroke 5, the BLT 1 acts on $h_\beta$, and produces as output 6 the stored vector $q_\beta$ that is nearest the input x, marked as 7. Upon presentation of an input vector x that is far from any of the stored vectors, there is need for activating a Hebb learning procedure, that ultimately must result in the addition of the vector x to the set of stored vectors. The learning procedure requires the addition of a matrix (6) to the connection matrix B of the BLT. The vector $h_\gamma$ in (6) is a "new" Hadamard vector, i.e., a Hadamard vector that has not yet been used as a label for a stored state. The Hebb learning (6) is indicated schematically in FIG. 4 by heavy lines with arrows. The heavy vertical line 8 depicts the transfer of the input vector x to the BLT, for use in the outer product (6), and likewise, the heavy horizontal line 9 depicts the transfer of the vector $h_\gamma$ to the BLT, for use in (6). A discussion of the physical process used for the modification of the BLT synapses in the manner of (6) falls outside the present invention. The Hebb learning is discussed here merely to provide context for the extension of the Hadamard memory, which causes the Hadamard memory to provide a new Hadamard vector $h_\gamma$ when learning is required. The extension comprises a correlator 10, a bipolar counter 11, and switches 12. The bipolar counter has the bit length $m = \log_2 N$. The correlator routinely computes the scalar product between the vector u and the vector $h_\beta$, the latter vector being the response of the Hadamard memory to its input u that is provided by the BLT. When the scalar product computed by the correlator falls below a predetermined positive number that may be considered a learning parameter, processes are activated that are indicated by the heavy lines 13, 14, and 15. First, a control signal along line 13 causes the counter to be incremented. Second, the bipolar counter word is concatenated with a string of zeros, such as to form an N-dimensional vector w, that is denoted as 16. Third, the vector w is presented to the Hadamard memory 2 as an input. The second and third steps are performed together by switches 12, which connect the first m input terminals of the Hadamard memory with the counter output, and which ground the remaining input terminals m+1 to N. In response to the input vector w, the Hadamard memory 2 produces as output $h_v$, the Hadamard vector for which the components 2 to m+1 are proportional to the bipolar counter word. This result is obtained because of the manner in which the memory 2 is connected. As a result of the peculiar connections, the memory 2, after being presented an input vector, always settles into a stationary state that is one of a complete set of Hadamard vectors of a kind that display shift invariance, and that can be generated by a maximal-length shift-register sequence [13]. Such Hadamard vectors have the window property [13]. As a result, there exists a one-to-one correspondence between these Hadamard vectors and the bipolar vectors of dimension m. The latter vectors may be seen as the counter words. The correspondence is realized simply by letting the Hadamard memory 2 respond to the vector w described above, the response being the Hadamard vector nearest w.

Several comments are in order.

First, we report the results of extensive numerical computations of associative recall of the Hadamard memory. These numerical computations were done for data dimension N=1024; for each input vector, the computations involve numerical integration of the 1023 coupled nonlinear differential equations (3), using a dendrite current $I_i$ provided by 28 synapses for each value of the index i, with connections chosen from a set B of nontrivial synapses, B being a subset of the triad group over the integers from 1 to 1024. The set B was determined by shifts of the 28 triads (2,5,12), (2,502,545), (2,512,517), (2,16,1019), (2,30,1013), (2,53,967), (2,58,1001), (2,77,956), (2,127,905), (2,152, 887), (2,115,941), (2,172,870), (2,252,785), (2,257,771), (2,343,684), (2,390,660), (2,408,638), (2,427,609), (2,477, 575), (2,479,551), (2,207,798), (2,193,852), (2,283,736), (2,187,830), (2,328,697), (2,384,679), (2,429,569), and (2,431,563). These triads were determined by the procedure discussed above. Applying shifts to the triads means adding, to all integers of each triad, a fixed integer p, which succesively is taken as 0, 1, . . . 1023. Wrapping is applied when necessary. The collection of all triads formed by applying shifts to the 28 triads shown above is the set B; clearly B is shift-invariant. The dendrites shown in FIGS. 1 and 2 are constructed for this case. Hence, dendrite #2, marked in FIG. 1 as 1, and marked in FIG. 2 as 2, connects the synapses that correspond to the list of triads (2,j,k) shown. As discussed above, the indices j and k are used as Cartesian coordinates for the synapse locations in the dendrite plane, as shown in FIGS. 1 and 2.

The set B of triads used includes only about 5.5% of all nontrivial triads in the triad group over $\Omega_{1024}$.

The synapses used in the numerical computations all have the RD circuit of FIG. 3, giving an output current to ground that is substantially proportional to the function $g(|x+y|)-g(|x-y|-d)$ discussed above, where d=0.48, which corresponds to the diode barrier of 0.6V of silicon diodes, after applying a scale adjustment from practical signal voltage limits of ±2.5V to the bipolar values *1 used in the theory.

The numerical integrations of the equations of motion (3) were made with time steps of magnitude $R_0 C_0/50$, where $R_0$ and $C_0$ are respectively the input resistance and input capacitance of the operational amplifiers that represent the neurons. As aluded to above, in (3) we have $R_0=1$ and $C_0=1$ as a matter of normalization. The neuron output function s(.), that occurs in (2), was chosen as a piece wise linear function with a gain $\mu$ (slope) of 50. This means that the amplifiers start to saturate to the bipolar values ±1 at activations of ±0.02. Initial-value coupling was used, with a coupling constant of unity.

In the computations of associative recall, the input vectors u to the Hadamard memory were chosen as bipolar corrupted versions of Hadamard vectors, the corruption being applied to 400 of the 1024 bipolar components; hence, the components at 400 places were multiplied by −1. The Hamming distance of 400 between input vector and the nearest Hadamard vector amounts to an angle of 77° between the two vectors. In the actual computations, the input vectors always had the Hadamard vector $h_2$ as the nearest Hadamard vector. This restriction does not constitute a loss of generality, because of the invariance of the dynamics under the Hadamard group [15].

The computations discussed were performed for a pseudo-random sample of input vectors. The 26973 cases computed so far have given perfect associative recall, with the exception of 3 cases, for which the memory settled on the wrong Hadamard vector.

The good associative recall, in spite of the skimpy set of connections that include only 5.5% of the full set implied by (5), is not well understood. It has to do with the exquisite selectivity of the keys that are provided by the connections according to triads; these keys match the class of Hadamard vectors used. The operation of these keys may be likened somewhat to the transcription of DNA.

The connections have here been defined by a subset B of the triad group. A construction of the triad group has been given here by means of recursion. The triad group can also be derived in another manner which is equivalent to our first procedure, but is much more cumbersome when N is large. The alternate method goes back to the subtracted connection matrix (5). As a first step, a complete set of Hadamard vectors $h_\alpha$, $\alpha=1$ to N, is calculated in some manner. Then one calculates all (N−1)(N−2)(N−3)/3! components of the tensor $S_{ijk}$, for which none of the indices is unity and all indices are different, skipping components with permuted indices. The set of triplets {i,j,k} for which $S_{ijk} \neq 0$ then define the full set of connections for the Hadamard memory. If this procedure is followed for N a power 2, and if the Hadamard vectors are constructed from maximal-length shift-register sequences, then the triplets {i,j,k} are identical to the nontrivial triads of the triad set over $\Omega_N$, and hence, the alternate procedure is equivalent to our first. The equivalence is due to the fact that 1) the Hadamard vectors constructed from maximal-length shift-register sequences form a group under component-wise multiplication, 2) this group is a representation of the triad group, and 3) the Hadamard vectors so constructed have the window property [13].

Although the construction of Hadamard vectors from maximal-length shift-register sequences requires N to be a power of 2, the alternate procedure can be executed for some other dimensions N. For instance, there is the construction of Hadamard vectors by quadratic residues, valid for any dimension N that is a multiple of 4 and equal to a prime plus unity [13]. If, for such an N that is not a power of 2, the alternated procedure is followed, the number of nonzero components of the connection tensor $S_{ijk}$ is of order $N^3$, instead of $O(N^2)$, found when N is a power of 2, and our first procedure is followed. This proliferation of connections is due to the loss of group property of the Hadamard vectors. Since the proof of stability [4] of Hadamard vectors in the discrete model relies on the group property of the Hadamard vectors, this stability is then in question also. Finally, there is the disadvantage that the nonvanishing components of the connection tensor $S_{ijk}$ do not all have the same value.

There exist dimensions N that are of the above mentioned form, but which also are powers of 2; N=4, 8, 32 are examples. For N=4 or N=8 the Hadamard vectors constructed by quadratic residues coincide with the Hadamard vectors constructed from maximal-lenght shift-register sequences, and therefore the alternate procedure, using the quadratic residue construction, leads to the triad group. However, for N=32 the Hadamard vectors constructed from quadratic residues are essentially different from those constructed from maximal-length shift-register sequences, and they do not form a group under component-wise multiplication. As a consequence, there is no triad group, and the number of connections is undully large. Therefore, not only must the dimension N be restricted to a power of 2, but one also needs to use Hadamard vectors generated from maximal-length shift-register sequences, if one wants to follow the alternate procedure for finding the triad group.

Of course, one can ignore the triad group altogether, and choose a subset of connections from the connections implied by the connection tensor (4) or (5). However, whether or not the triad group is acknowledged, this procedure is equivalent to the method that is phrased in terms of the triad group.

Switches may be chosen as solid-state switches, built in CMOS, if great speed is not required. Substantial simultaneity of switching of the different components of vectors may be an issue, depending on the slew rate of the amplifiers, and high-speed switches may be required for proper operation of the Hadamard memory.

The three couplings, initial value coupling, external coupling, and combined coupling, that were described briefly in the background section, are used in the present invention in the following manner.

In all cases considered, the input currents $u_n$, n=2 to N, are applied directly to the amplifier inputs in a substantially synchronous manner. If this is done to amplifiers without input switches, the coupling of input currents to the Hadamard memory constitutes an external coupling, with an initial activation that is "left over" from the previous round of associative recall. For this coupling, computer simulations have shown the Hadamard memory to perform well if the currents $u_n$ have the magnitude V/R, where V is the maximum magnitude of the neuron signals, and R is the resistance of the resistors in the synapse circuit of FIG. 3.

If switches are provided between dendrites and amplifier inputs, and the switches are opened before the input currents $u_n$, n=2 to N, are applied to the amplifier input ports, then the synapse outputs are disconnected from the amplifier inputs, so that the amplifier activations are just the current inputs. By closing the input switches in simultaneous fashion, the full net dynamics is started, using as initial activations the input currents $u_n$. If the input currents $u_n$ are maintained while the dynamical development of the signal state proceeds, we have a case of combined coupling. If the input currents are reduced to zero in simultaneous fashion shortly after the net dynamics has been started, the coupling is initial value coupling.

In FIGS. 1 and 2 we admit to some fudging that was done because the number of gaps between adjacent dendrites is not divisible by 64.

The recursions described by formula (13) and (14), together with Tables I and II, for values of m from 2 to 20, have been derived from Table A.2. of [13], by transcribing the polynomials as products, in a manner that will be clear from inspection. The recursion formula for m=21 was determined by a numerical computation, using the criterion that the sequence of vectors $g_i$ generated must include all m-dimensional bipolar vectors, with the exception of the all-positive vector.

The concept of Selective Reflexive Memory (SRM) was introduced and developed in [1–4,14–16]. The SRM has as rear stage a Hadamard memory. Investigation of the asynchronous discrete model of the Hadamard memory has been reported in detail in [4], and a summary on this work is shown in [2]. The continuous model for the Hadamard memory is discussed in [14], and a partial summary is given in [3]. The group theory for Hadamard memories is developed in [15] and [16]. An overview of the SRM, with emphasis on the Hadamard memory, is given in [16]. The extension of the Hadamard memory, arranged to provide new Hadamard vectors for Hebb learning purposes is discussed in [16].

The invention is not limited by the embodiments shown in the drawings and described in the description, which are given by way of example and not of limitation, but only in accordance with the scope of the appended claims.

REFERENCES

[1] H. G. Loos, "Reflexive Associative Memories", in NEURAL INFORMATION PROCESSING SYSTEMS, Ed. Dana Z. Anderson, American Institute of Physics, New York, 1988, p.495

[2] H. G. Loos, "Quadratic Hadamard Memories", Proceedings, International Joint Conference on Neural Networks, San Diego, Calif., Jun. 17–21, 1990, p. I-735

[3] H. G. Loos, "Continuum Model for Quadratic Memories", Proceedings, International Joint Conference on Neural Networks, Seattle, Wash., Jul. 8–12, 1991, p.11–297

[4] H. G. Loos, "Quadratic Hadamard Memories I", Tech. Rep. #1, ARPA Order No. 6429, Contract DAAH01-88-C-0887, 1989

[5] B. Kosko, Proceedings IEEE International Conference on Neural Networks (ICNN-87), p.II-261 (1987)

[6] B. Kosko, IEEE Trans. SMC-18, 49 (1988)

[7] B. Kosko, Appl. Optics 26, 4947 (1987)

[8] H. H. Chen, Y. C. Lee, G. Z. Sun, and H. Y. Lee, "High Order Correlation Model for Associative Memory", in NEURAL NETWORKS FOR COMPUTING, AIP Conference Proceedings #151, p.86 (1986)

[9] D. J. Volper and S. E. Hampson, Neural Networks 3, 93 (1990)

[10] J. J. Hopfield, "Neural networks and physical systems with emergent collective computational abilities", Proc. Natl. Acad. Sci. USA 79, 2554 (1982)

[11] C. Mead, ANALOG VLSI AND NEURAL SYSTEMS, Addison-Wesley, New York, 1989

[12] D. O. Hebb, ORGANIZATION OF BEHAVIOR; A NEUROPSYCHOLOGICAL THEORY, Wiley, New York, 1949

[13] M. Harwit and N. J. A. Sloane, HADAMARD TRANSFORM OPTICS, Academic Press, New York, 1979

[14] H. G. Loos, Quadratic Hadamard Memories II", Tech. Rep. #2, ARPA Order No. 6429, Contract DAAH01-88-C-0887, 1990

[15] H. G. Loos, "Group Theory of Memories with Quadratic Activation", Tech. Rep. #3, ARPA Order No. 6429, Contract DAAH01-88-C-0887, 1991

[16] H. G. Loos, "Adaptive Stochastic Content-Addressable Memory", Final Report, ARPA Order No. 6429, Contract DAAH01-88-C-0887, 1991

I claim:

1. An apparatus for an electronic neural network that serves as an associative memory in which the stored states are Hadamard vectors of dimension N, the said dimension N being a power of 2, the said apparatus comprising:

circuit means for N−1 amplifiers $A_n$, n=2 to N, each of the said amplifiers having an input port and two output ports denoted as output port $c_+$ and output port $c_-$, the input port of amplifier $A_n$ being denoted as $A_n(a)$, the output port $c_+$ of amplifier $A_n$ being denoted as $A_n(c_+)$ and the ouput port $c_-$ of amplifier $A_n$ being denoted as $A_n(c_-)$, said circuit means being such that the said input port is held substantially at zero potential, the voltages at the said output port $c_+$ and the said output port $c_-$ have substantially opposite values, and the voltage at the said output port $c_+$ is s(I), where I is the current into the said input port, and s(.) is a sigmoidal function which is substantially antisymmetric and ranges substantially from −V to V, V being a predetermined positive voltage;

circuit means for K electronic units, K being divisible by 3, each said electronic unit being called a synapse, each said synapse having one output port and four input ports, denoted as input port $a_+$, input port $a_-$, input port $b_+$, and input port $b_-$, the said circuit means being such that, when substantially opposite voltages are applied to the said input port $a_+$ and the said input port $a_-$, and substantially opposite voltages are applied to the said input port $b_+$ and the said input port $b_-$, the current from the said output port to ground is substantially proportional to $g(|x+y|-d)-g(|x-y|-d_2)$, where x and y are respectively the voltages at the said input port $a_+$ and the said input port $b_+$, and where furthermore $d_1$ and $d_2$ are constants, and g(.) is a function such that g(q)=q if q>0, else zero;

connections between each of the said amplifiers and a plurality of said electronic units, a connection existing between $A_j(c_+)$ and the said input port $a_+$ of a said synapse, a connection existing between $A_j(c_-)$, and the said input port $a_-$ of the last said synapse, a connection existing between $A_k(c_+)$ and the said input port $b_+$ of the last said synapse, a connection existing between $A_k(c_-)$ and the said input port $b_-$ of the last said synapse, and a connection existing between the said output port of the last said synapse and $A_i(a)$, if and only if the integers i, j, and k occur together in a triad that belongs to a fixed shift-invariant triad set B, the said triad set B having a cardinality equal to K/3, the said triad set B being a subset of the set of nontrivial triads for the shift-invariant triad group over the integers from 1 to N, the said triad group being such that the integer 1 serves as the identity element;

N−1 conductors $C_n$, n=2 to N;

a connection, for every n=2 to N, between conductor $C_n$ and $A_n(a)$; and circuit means for applying, for every n=2 to N, a current $u_n$ to conductor $C_n$, the said current $u_n$ being applied for all n=2 to N in a substantially simultaneous manner;

circuit means for outputting voltages $y_n$, n=1 to N, $y_1$ being the said predetermined positive voltage, and $y_n$, n=2 to N, being the voltage on $A_n(c_+)$.

2. An apparatus according to claim 1, further including:

circuit means for a bipolar counter, the said bipolar counter having a bit length m=$\log_2$N, the said bipolar counter having output ports $p_q$, q=1 to m, the voltage on $p_q$ being called the bipolar counter output q;

circuit means for a correlator, the said correlator having an output port, the said circuit means being such that the voltage at the last said output port is substantially proportional to the scalar product of a first vector and a second vector, the said first vector being the said input vector to the said associative memory, and the said second vector having as components the said voltages $y_n$, n=1 to N;

circuit means for incrementing the said bipolar counter;

circuit means for applying, in substantially simultaneous fashion for every integer n from 2 to N, a current $w_n$ to conductor $C_n$, the said current $w_n$, for n≤m+1, being proportional to the said bipolar counter output q, where q=n−1, and the said current $w_n$, for n>m+1, being substantially zero;

circuit means for activating the said incrementing, as a result of the last said voltage being less than a predetermined value; and circuit means for commencing the said applying, as a result of the said incrementing.

3. An apparatus according to claim 1, in which the said circuit means for the said electronic unit is comprised of connections, resistors $R_b$, b=1 to 8, and diodes $D_c$, c=1 to 4, the terminals of resistor $R_b$ being denoted as $R_b(1)$ and $R_b(2)$, the terminals of diode $D_c$ being denoted as $D_c(1)$ and $D_c(2)$, such that current can be passed through the said diode $D_c$ in the direction from $D_c(1)$ to $D_c(2)$, c=1 to 4, the said connections being such that the said output port of the said synapse is connected to $D_1(2)$, $D_2(1)$, $D_3(2)$, and $D_4(1)$, $D_1(1)$ is connected to $R_1(1)$ and $R_2(1)$, $D_2(2)$ is connected to $R_3(1)$ and $R_4(1)$, $D_3(1)$ is connected to $R_5(1)$ and $R_6(1)$, $D_4(2)$ is connected to $R_7(1)$ and $R_8(1)$, the said port $a_+$ of the last said synapse is connected to $R_1(2)$ and $R_8(2)$, the said port $a_-$ of the last said synapse is connected to $R_4(2)$ and $R_5(2)$, the said port $b_+$ of the last said synapse is connected to $R_2(2)$ and $R_3(2)$, and the said port $b_-$ of the last said synapse is connected to $R_6(2)$ and $R_7(2)$.

4. An apparatus according to claim 2, in which the said circuit means for the said electronic unit is comprised of connections, resistors $R_b$, b=1 to 8, and diodes $D_c$, c=1 to 4, the terminals of resistor $R_b$ being denoted as $R_b(1)$ and $R_b(2)$, the terminals of diode $D_c$ being denoted as $D_c(1)$ and $D_c(2)$, such that current can be passed through the said diode $D_c$ in the direction from $D_c(1)$ to $D_c(2)$, c=1 to 4, the said connections being such that the said output port of the said synapse is connected to $D_1(2)$, $D_2(1)$, $D_3(2)$, and $D_4(1)$, $D_1(1)$ is connected to $R_1(1)$ and $R_2(1)$, $D_2(2)$ is connected to $R_3(1)$ and $R_4(1)$, $D_3(1)$ is connected to $R_5(1)$ and $R_6(1)$, $D_4(2)$ is connected to $R_7(1)$ and $R_8(1)$, the said port $a_+$ of the last said synapse is connected to $R_1(2)$ and $R_8(2)$, the said port $a_-$ of the last said synapse is connected to $R_4(2)$ and $R_5(2)$, the said port $b_+$ of the last said synapse is connected to $R_2(2)$ and $R_3(2)$, and the said port $b_-$ of the last said synapse is connected to $R_6(2)$ and $R_7(2)$.

5. An apparatus for an electronic neural network that serves as an associative memory in which the stored states are Hadamard vectors of dimension N, the said dimension N being a power of 2, comprising:

circuit means for N−1 amplifiers $A_n$, n=2 to N, each of the said amplifiers having an input port, and two output ports denoted as output port $c_+$ and output port $c_-$, the input port of amplifier $A_n$ being denoted as $A_n(a)$, the output port $c_+$ of amplifier $A_n$ being denoted as $A_n(c_+)$, and the output port $c_-$ of amplifier $A_n$ being called $A_n(c_-)$, said circuit means being such that the said input port is held substantially at zero potential, the voltages at the said output port $c_+$ and the said output port $c_-$ have substantially opposite values, and the voltage at the said output port $c_+$ is s(I), where I is the current into the said input port, and s(.) is a sigmoidal function which is substantially antisymmetric and ranges substantially from −V to V, V being a predetermined positive voltage;

circuit means for K electronic units, K being divisible by 3, each of the said electronic unit being called a synapse, each said synapse having one output port and four input ports, denoted as input port $a_+$, input port $a_-$, input port $b_+$, and input port $b_-$, the said circuit means being such that, when substantially opposite voltages are applied to the said input port $a_+$ and the said input port $a_-$, and substantially opposite voltages are applied to the said input port $b_+$ and the said input port $b_-$, the current from the said output port to ground is substantially proportional to $g(|x+y|-d_1)-g(|x-y|-d_2)$, where x and y are respectively the voltages at the said input port $a_+$ and the said input port $b_+$, and where furthermore $d_1$ and $d_2$ are constants, and g(.) is a function such that g(q)=q if q>0, else zero;

a conductor for every integer n=2 to N, the said conductor being called the dendrite n;

circuit means for a switch for every integer n=2 to N, the said switch being of SPST type, the said switch having two terminals, the said terminals being called $s_1$ and $s_2$, the said switch being called the switch n;

a connection, for every n=2 to N, between the said terminal $s_1$ of the said switch n and the said dendrite n;

a connection, for every n=2 to N, between the said terminal $s_2$ of the said switch n and $A_n(a)$;

connections between each of the said amplifiers and a plurality of said electronic units, a connection existing between $A_j(c_+)$ and the said input port $a_+$ of a said synapse, a connection existing between $A_j(c_-)$, and the said input port $a_-$ of the last said synapse, a connection existing between $A_k(c_+)$ and the said input port $b_+$ of the last said synapse, a connection existing between $A_k(c_-)$ and the said input port $b_-$ of the last said synapse, and a connection existing between the said output port of the last said synapse and the dendrite i, if and only if the integers i, j, and k occur together in a triad that belongs to a fixed shift-invariant triad set B, the said triad set B having a cardinality equal to K/3, the said triad set B being a subset of the set of nontrivial triads for the shift-invariant triad group over the integers from 1 to N, the said triad group being such that the integer 1 serves as the identity element;

conductors $C_n$, n=2 to N;

a connection, for every n=2 to N, between conductor $C_n$ $A_n(a)$; and circuit means for applying, for every n=2 to N, a current $u_n$ to conductor $C_n$, the current $u_n$ being applied for all n=2 to N in a substantially simultaneous manner; and circuit means for outputting voltages $y_n$, n=1 to N, $y_1$ being the said predetermined positive voltage, and $y_n$, n=2 to N, being the voltage on $A_n(c_+)$.

6. An apparatus according to claim 5, further including:

circuit means for a bipolar counter, the said bipolar counter having a bit length $m=\log_2 N$, the said bipolar counter having output ports $p_q$, q=1 to m, the voltage on $p_q$ being called the bipolar counter output q;

circuit means for a correlator, the said correlator having an output port, the said circuit means being such that the voltage at the last said output port is substantially proportional to the scalar product of a first vector and a second vector, the said first vector being the said input vector to the said associative memory, and the said second vector having as components the said voltages $y_n$, n=1 to N;

circuit means for incrementing the said bipolar counter;

circuit means for opening, for each n=2 to N, the said switch n;

circuit means for applying, in substantially simultaneous fashion for each integer n from 2 to N, a current $w_n$ to conductor $C_n$, the said current $w_n$, for n≦m+1, being proportional to the said bipolar counter output q, where q=n−1, and the said current $w_n$, for n>m+1 being substantially zero;

circuit means for closing, for each n=2 to N, the said switch n, the said circuit means being such that the said closing being done in substantially simultaneous fashion for all b=2 to N;

circuit means for activating the said incrementing, as a result of last said voltage being less than a predetermined value; and circuit means for commencing the said applying, as a result of the said incrementing.

7. An apparatus according to claim 5, in which the said circuit means for the said electronic unit is comprised of connections, resistors $R_b$, b=1 to 8, and diodes $D_c$, c=1 to 4, the terminals of resistor $R_b$ being denoted as $R_b(1)$ and $R_b(2)$, the terminals of diode $D_c$ being denoted as $D_c(1)$ and $D_c(2)$, such that current can be passed through the said diode $D_c$ in the direction from $D_c(1)$ to $D_c(2)$, c=1 to 4, the said connections being such that the said output port of the said synapse is connected to $D_1(2)$, $D_2(1)$, $D_3(2)$, and $D_4(1)$,$D_1(1)$ is connected to $R_1(1)$ and $R_2(1)$, $D_2(2)$ is connected to $R_3(1)$ and $R_4(1)$, $D_3(1)$ is connected to $R_5(1)$ and $R_6(1)$, $D_4(2)$ is connected to $R_7(1)$ and $R_8(1)$, the said port $a_+$ of the last said synapse is connected to $R_1(2)$ and $R_8(2)$, the said port $a_-$ of the last said synapse is connected to $R_4(2)$ and $R_5(2)$, the said port $b_+$ of the last said synapse is connected to $R_2(2)$ and $R_3(2)$, and the said port $b_-$ of the last said synapse is connected to $R_6(2)$ and $R_7(2)$.

8. An apparatus according to claim 6, in which the said circuit means for the said electronic unit is comprised of connections, resistors $R_b$, b=1 to 8, and diodes $D_c$, c=1 to 4, the terminals of resistor $R_b$ being denoted as $R_b(1)$ and $R_b(2)$, the terminals of diode $D_c$ being denoted as $D_c(1)$ and $D_c(2)$, such that current can be passed through the said diode, from $D_c(1)$ to $D_c(2)$, c=1 to 4, the said connections being such that the said output port of the said synapse is connected to $D_1(2)$, $D_2(1)$, $D_3(2)$, and $D_4(1)$, $D_1(1)$ is connected to $R_1(1)$ and $R_2(1)$, $D_2(2)$ is connected to $R_3(1)$ and $R_4(1)$, $D_3(1)$ is connected to $R_5(1)$ and $R_6(1)$, $D_4(2)$ is connected to $R_7(1)$ and $R_8(1)$, the said port $a_+$ of the last said synapse is connected to $R_1(2)$ and $R_8(2)$, the said port $a_-$ of the last said synapse is connected to $R_4(2)$ and $R_5(2)$, the said port $b_+$ of the last said synapse is connected to $R_2(2)$ and $R_3(2)$, and the said port $b_-$ of the last said synapse is connected to $R_6(2)$ and $R_7(2)$.

9. In a neural network that includes synapses and neurons $A_n$, n=2 to N, N being a power of 2, said synapses having two inputs and one output, a method for connecting neurons to synapses, the said method comprising:

constructing the shift-invariant triad group over the integers from 1 to N, the said group being such that the integer 1 serves as the identity element, the structure of the group being expressed by triads, the triad with integers i, j, and k being denoted by (i,j,k);

selecting the set S of said triads that do not include the integer 1;

selecting a proper subset B of S, said subset B being shift-invariant; and connecting the output of neuron $A_j$ and the output of neuron $A_k$ respectively to one input and to the other input of a said synapse, and connecting the output of the last said synapse to the input of neuron $A_i$, if and only if the triad (i,j,k) belongs to the said subset B.

10. A method according to claim 9, further including the steps of selecting a subset $B_2$ of B, the subset $B_2$ being comprised of all triads (2,j,k), the said subset $B_2$ defining the dendrite for neuron $A_2$, the said dendrite having straight-line segments, each of the said segments having a slope; and restricting the said subset B in such a manner that each of the said slopes of the segments of the dendrite is at most a fixed positive number that is smaller than 4.

11. In a neural network that includes neurons, the method of providing activations that substantially are sums of signals $g(|x+y|-d_1)-g(|x-y|-d_2)$, where x and y are outputs of two of the said neurons, $d_1$ and $d_2$ are constants, and g(.) is a function such that g(q)=q if q>0, else zero.

* * * * *